United States Patent [19]
Campbell

[11] Patent Number: 5,711,564
[45] Date of Patent: Jan. 27, 1998

[54] LITTER SCOOP

[76] Inventor: Terry A. Campbell, 1695 Pearson Avenue, Prince George, British Columbia, Canada, V2L 4K7

[21] Appl. No.: 784,903

[22] Filed: Jan. 16, 1997

[51] Int. Cl.⁶ ............................. A01K 29/00; E01H 1/12
[52] U.S. Cl. ............................................. 294/1.3; 294/55
[58] Field of Search ........................... 294/1.1, 1.3, 1.4, 294/49, 55; 15/257.1, 257.3, 257.4, 257.6; 119/161; 141/108, 109, 390, 391; 209/417–419

[56] References Cited

U.S. PATENT DOCUMENTS

| | | | |
|---|---|---|---|
| D. 255,951 | 7/1980 | Halls et al. | 294/1.3 X |
| 4,243,259 | 1/1981 | Wright | 294/1.3 |
| 4,483,560 | 11/1984 | Lordi | 294/1.3 |
| 5,107,666 | 4/1992 | Rahtican | 294/1.1 X |
| 5,580,111 | 12/1996 | Bohn | 294/1.3 |

OTHER PUBLICATIONS

Litter Valet pamphlet (1995), Tail End Pet Products, Inc.

*Primary Examiner*—Johnny D. Cherry
*Attorney, Agent, or Firm*—Jagtiani & Associates

[57] ABSTRACT

A scoop apparatus for removing animal faeces from a litter box has a channel shaped configuration to permit easy cleaning rather than a tubular shape. Also the scoop has a retaining section for holding the faeces and stop them falling out of the scoop. The apparatus has an open channel shaped scoop member with side walls having substantially in line top edges, the side walls have bottom edges joined to a base; an entry lip at one end of the scoop member is in line with the top edges of the side walls leading to a substantially flat receiving portion sloped down to the base of the scoop member. A plurality of diamond shaped sifting openings are provided in the receiving portion for sifting out litter particles, and the scoop member has a handle portion adjacent the receiving portion with a width less than the receiving portion, and an exit at the end of the scoop member opposite the entry lip, adapted to have a disposable bag attached thereto.

6 Claims, 4 Drawing Sheets

5,711,564

1
LITTER SCOOP

TECHNICAL FIELD

This invention relates to a scoop apparatus for removing animal faeces from litter particles in a litter box.

BACKGROUND OF THE INVENTION

In the field of pet products, it is common to use a scoop for removing animal faeces from litter particles in a litter box. Typically such scoops have an open channel shaped receiving portion leading to a hollow or tubular handle portion. Such receiving portions have a plurality of slits in the base of the channel for sifting out the litter particles. Also, the handle portion is typically adapted to have a disposal bag attached thereto.

Such a scoop is used by first inserting the receiving portion into the litter in a litter box. The scoop is then lifted out of the litter, thereby leaving litter particles and faeces in the receiving portion. The scoop is then tilted back allowing the litter particles to fall out the slits and the faeces to fall through the hollow handle and into a disposal bag attached to the end of the handle.

Such scoops have, however, been found to be difficult to clean as the hollow handle is enclosed and therefore the inside wall of the handle is hard to reach. It is known that cat faeces can transmit diseases by contact, therefore it is imperative that litter scoops can be easily cleaned. Also, for such scoops to be effective, a disposal bag is required with each use. Without the disposal bag, the user of the scoop would have to handle the scoop carefully in order to prevent spillage of the faeces. Furthermore, such scoops have been manufactured for use with clay litter. However, non-clay litter is now available which generally has larger particle sizes than clay litter. Using such scoops for non-clay litter tends to lead to litter particles being removed along with the faeces. The present invention addresses the above problems.

SUMMARY OF THE INVENTION

In accordance with one aspect of the invention, there is provided an apparatus for removing animal faeces from litter particles in a litter box. The apparatus is an open channel shaped scoop member having side walls with substantially in line top edges. The scoop member does not have a hollow handle but is an open channel or trough and therefore can easily be cleaned. The side walls have bottom edges which are joined to a base. An entry lip is at one end of the scoop member in line with the top edges of the side walls. The entry lip leads to a substantially flat receiving portion which is sloped down to the base of the scoop member. There are a plurality of diamond shaped sifting openings in the receiving portion for sifting out litter particles. These openings are larger than the slits provided in the known types of scoops and therefore allow the larger litter particles to be separated from the faeces and drop back into the litter container. Furthermore, the scoop member has a handle portion adjacent the receiving portion. The handle portion has a width less than the receiving portion and an exit at the end of the scoop member opposite the entry lip. The handle portion is also adapted to have a disposable bag attached thereto.

Preferably, the receiving portion has a substantially flat retainer section positioned between the sifting openings and the handle portion.

In another embodiment, the scoop member has a link member which is level with the top edges of the side walls.

2

The link member has ends joined to the side walls at the exit to provide a hanging loop.

In yet another embodiment, the apparatus has a removable lid adapted to cover an opening formed between the top edges of the side walls along the length of the handle portion.

In a still further embodiment, the apparatus has a hinge having a first hinge portion joined to the lid and a second hinge portion joined to one of the side walls. The hinge is adapted to allow the movement of the lid between a closed position wherein the opening is covered by the lid and an open position wherein the opening is not covered by the lid.

In accordance with another aspect of the invention, the lid has a side edge joined to one of the top edges of the side walls forming a living hinge. The living hinge is adapted to allow the movement of the lid between a closed position wherein the opening is covered by the lid and an open position wherein the opening is not covered by the lid.

BRIEF DESCRIPTION OF THE DRAWINGS

In drawings which illustrate embodiments of the invention.

BEST MODE FOR CARRYING OUT THE INVENTION

Figure 1:
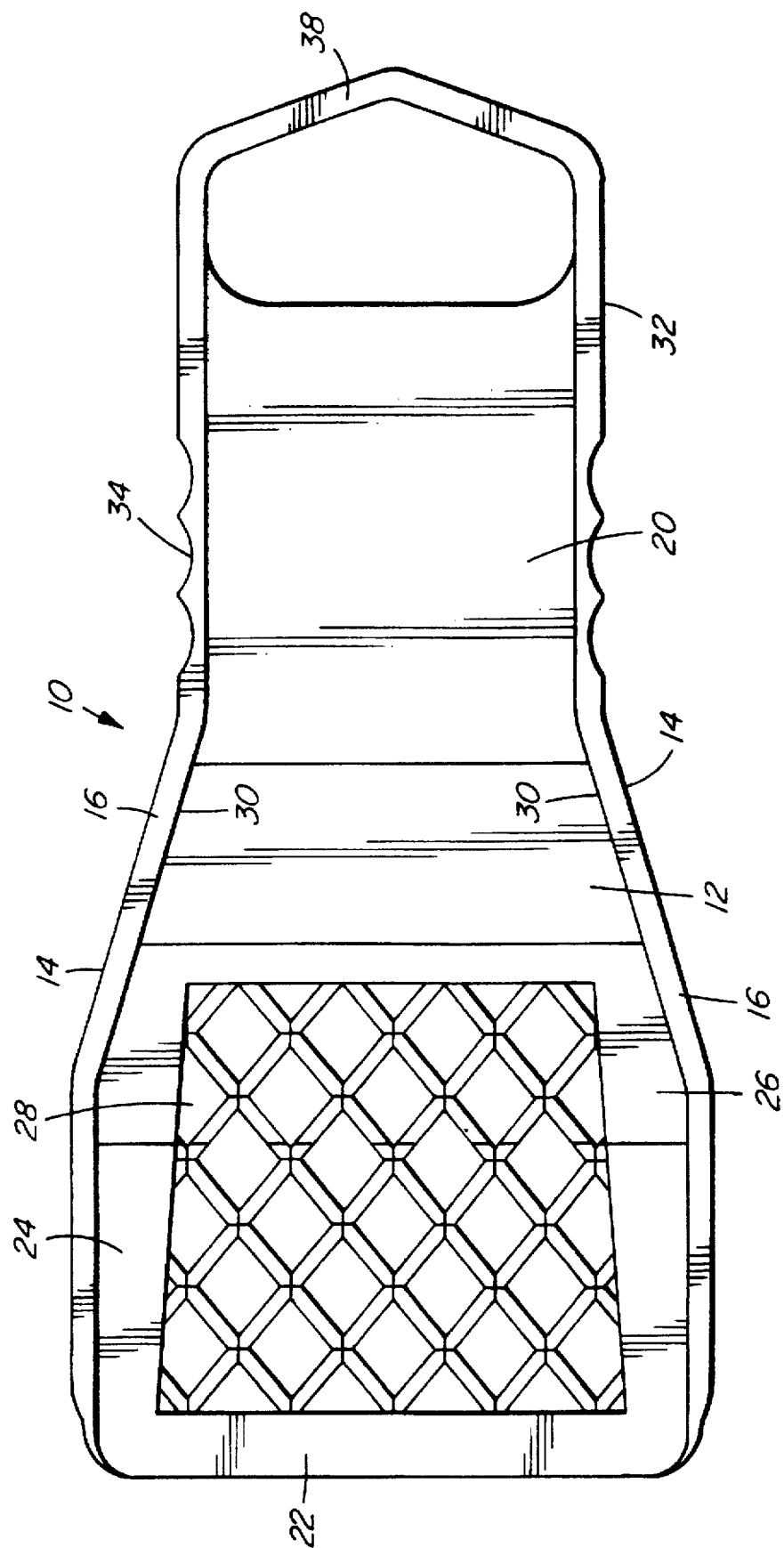
FIG. 1 is a plan view showing an apparatus according to one embodiment of the invention.
Figure 2:
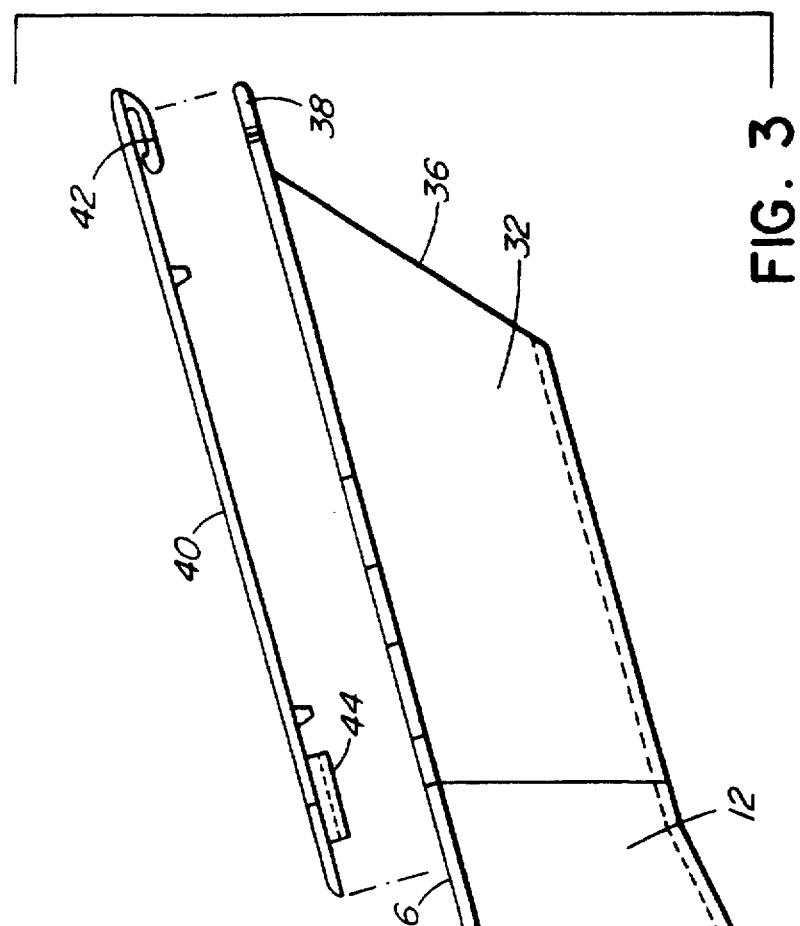
FIG. 2 is an end view showing the apparatus of FIG. 1.
Figure 3:
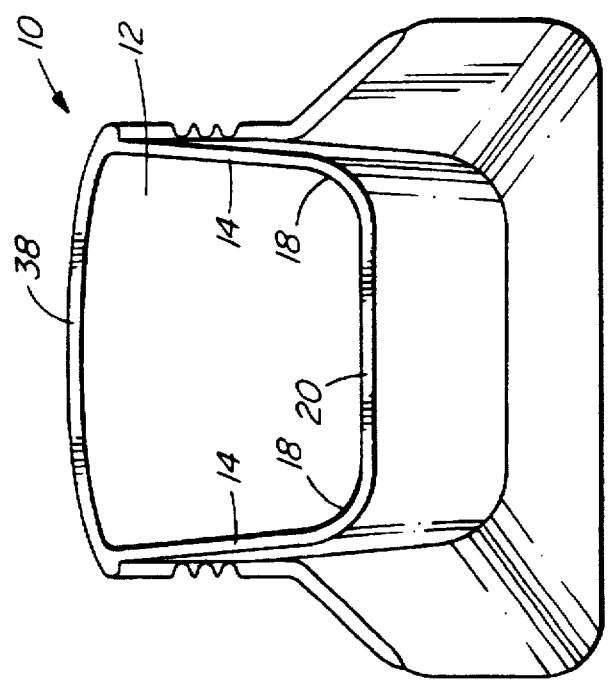
FIG. 3 is a side view showing the apparatus of FIG. 1 with a removable lid.
Figure 3:
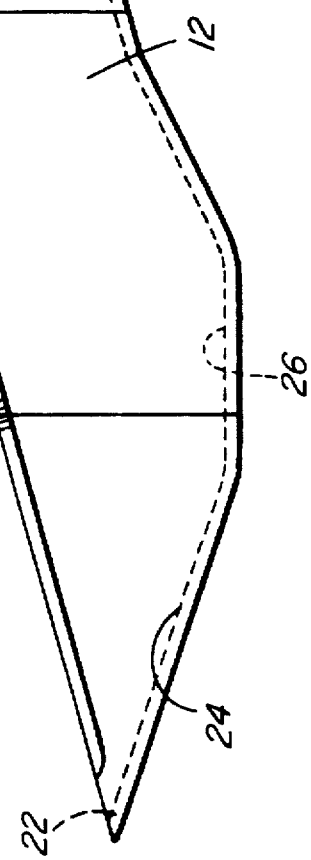

Referring to FIGS. 1 to 3, a scoop apparatus 10 has an open channel shaped scoop member 12 with side walls 14 extending up to substantially in line top edges 16. The side walls 14 have corners 18 at the bottom joining to a base 20.

An entry lip 22 at one end of the scoop member 12 in line with the top edges 16, has a first sloped receiving portion 24 which leads down to the base 20. Adjacent the receiving portion 24 is a flat portion 26 which acts as a retaining section to hold faeces therein. Diamond shaped sifting openings 28 extend for portions of the receiving portion 24 and retainer section 26. The flat retainer section 26 forms part of the base 20 and the depth of the walls 14 are reduced after the retainer section 26. Similarly, the width of the base 20 is reduced by tapered portions 30 of the walls 14. The tapered portions 30 of the walls form a handle portion 32 which has finger grips 34 and a tapered exit 36 as illustrated in FIG. 3. The handle portion 32 is suitable for attaching a disposable bag thereto so that faeces can be passed through the exit 36 into the bag.

Whereas the scoop member 12 has an open channel shape, it has a link member 38 at the exit end of the top edges 16. The link member 38 has a bend in the approximately centre of the scoop member 12 and thus provides a hanging loop for hanging the scoop apparatus 10 on a hook or nail.

Figure 4:
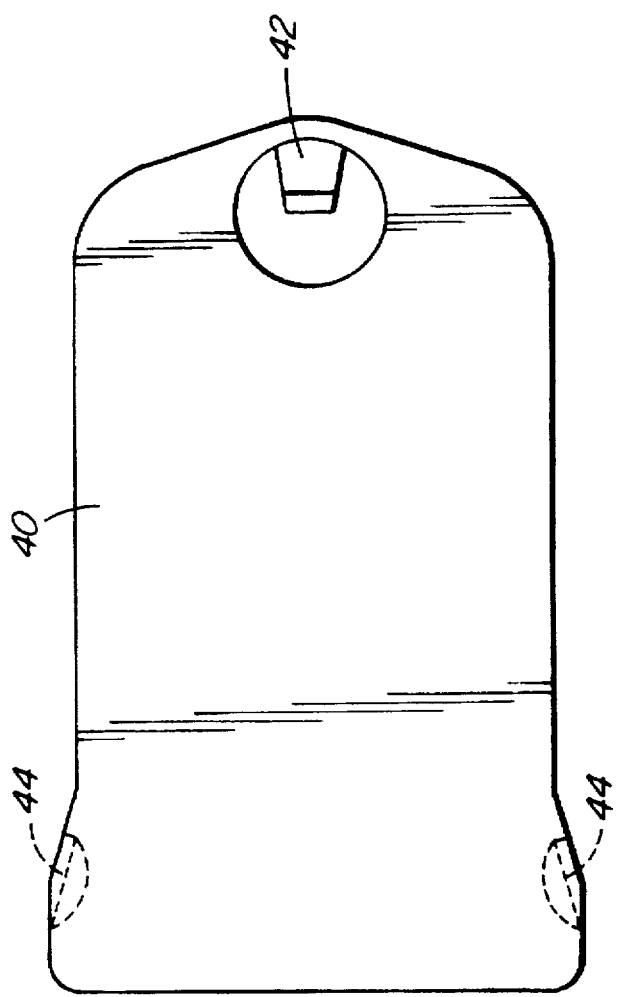
FIG. 4 is a plan view showing the removable lid illustrated in FIG. 3.

As shown in FIGS. 3 and 4, a removable lid 40 may be attached to the top edges 16 of the handle portion 32. The lid 40 has an attachment hook 42 to fit over the link member 38 and two attachment clips 44 at the sides to clip into the in line top edges 16. The lid 40 may be left in place for use and removed for cleaning purposes.

Figure 5:
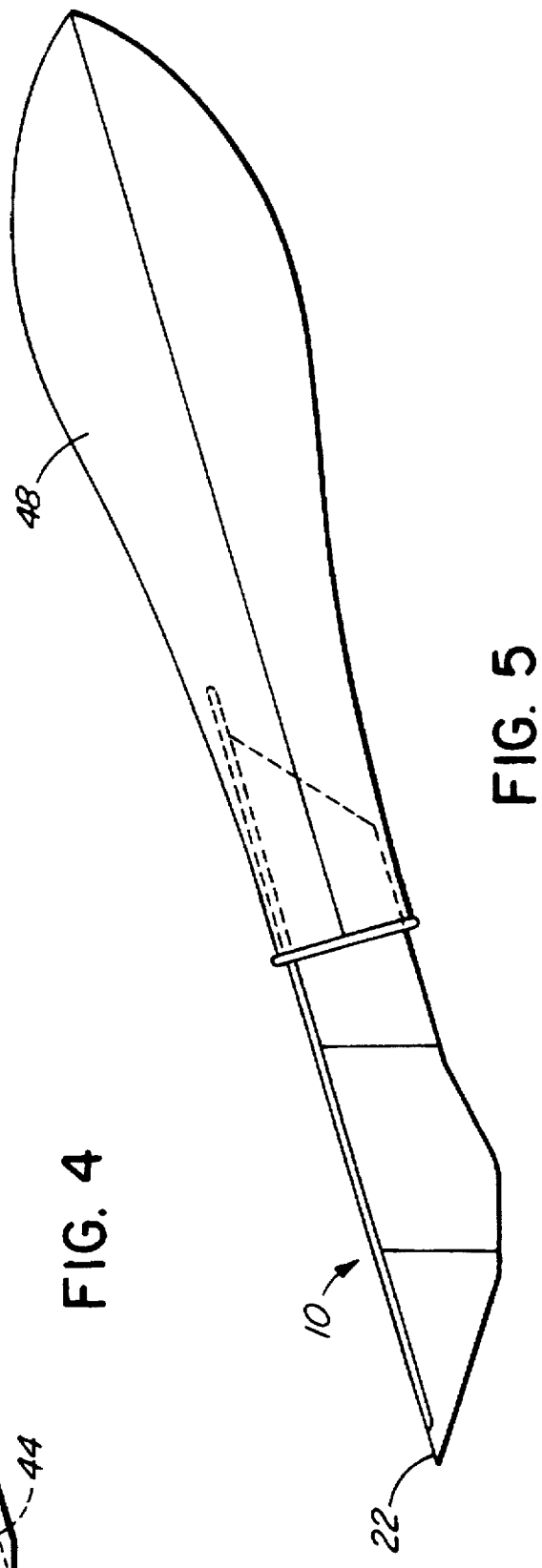
FIG. 5 is a side view showing an apparatus according to another embodiment of the present invention with a removable bag attached thereto.

FIG. 5 illustrates a disposable bag 48 attached over the exit end of the scoop apparatus 10. The disposable bag is preferably plastic and has a sealable opening which fits snugly over the end of the scoop apparatus and can be held by a person using the scoop. The bag opening can be folded back so that it partially grips the scoop apparatus 10.

Figure 6:
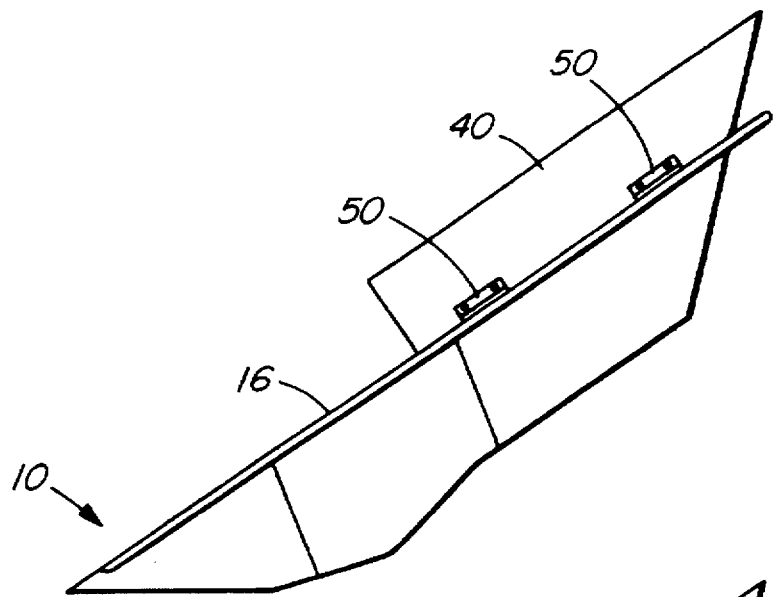
FIG. 6 is a side view showing an apparatus according to a further embodiment of the present invention with a hinged lid

FIG. 6 shows another embodiment of the present invention with a removable lid 40 having hinges 50 attached to one of the in line top edges 16. The lid 40 is not shaped in the same manner as that shown in FIG. 3 but is curved to provide a more tubular opening for the handle portion.

Figure 7:
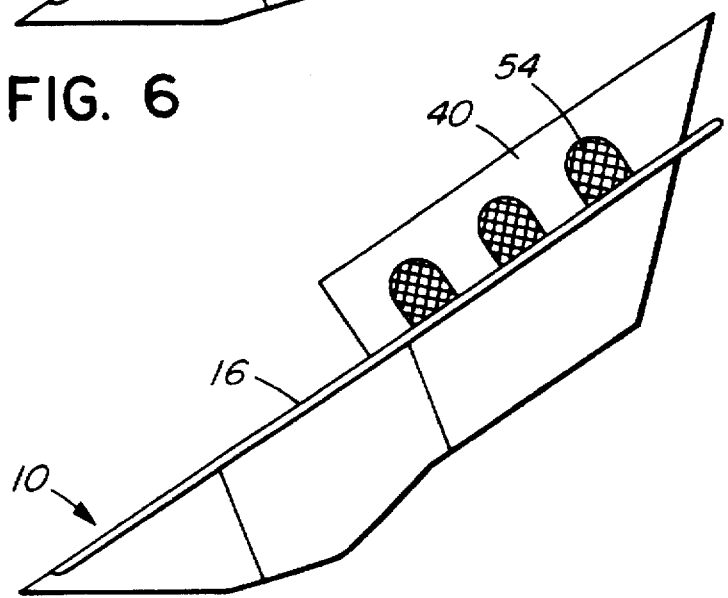
FIG. 7 is a side view showing an apparatus according to a still further embodiment of the invention with another type of hinged lid.
Figure 8:
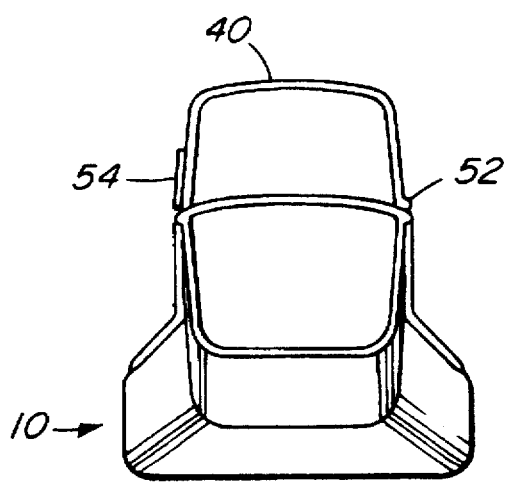
FIG. 8 is an end view showing the apparatus of FIG. 7.

FIGS. 7 and 8 show a still further embodiment wherein the lid 40 is attached to one of the in line top edges 16 by means of a living hinge 52. Finger grips 54 are shown in FIG. 7. These are on the opposite sides of the living hinge 52 to permit the lid 40 to open easily. A catch, not shown, retains the lid 40 closed. As seen in FIG. 8, the shape of the lid is curved to provide a substantially oval exit from the scoop apparatus 10.

In operation the scoop 10 may be used with or without a disposable bag 48. If used with a bag, then the bag is placed over the handle portion 32 of the scoop 10. A user picks up the faeces in the receiving portion 24 and shakes it over the litter box to ensure that any litter picked up with the faeces is returned to the litter box. Then the scoop is raised so that the faeces drops through the exit 36 into the disposable bag 48. The lid 40 is shown in different embodiments but is not an essential part of the scoop apparatus. The purpose for the lid being either removable or hinged is to ensure that the scoop apparatus can be properly cleaned. In some instances when a disposable bag is not used or for some reason is not available, the faeces can be retained in the substantially flat retainer section 26 and after sifting can simply be tipped forward or backward into a container or disposable receptacle.

Various changes may be made to the embodiments shown herein without departing from the scope of the present invention which is limited only by the following claims.

I claim:

1. A scoop apparatus for removing animal faeces from litter particles in a litter box comprising:

a. an open channel shaped scoop member having side walls with substantially in line top edges, the side walls having bottom edges joined to a base;
    b. an entry lip at one end of said scoop member in line with the top edges of the side walls leading to a substantially flat receiving portion sloped down to the base of the scoop member;
    c. a plurality of diamond shaped sifting openings in the receiving portion for sifting out litter particles; and,
    d. the scoop member having a handle portion adjacent the receiving portion with a width less than the receiving portion and an exit at the end of the scoop member opposite the entry lip and adapted to have a disposable bag attached thereto.

2. A scoop apparatus as claimed in claim 1 wherein the receiving portion has a substantially flat retainer section positioned between the sifting openings and the handle portion.

3. A scoop apparatus as claimed in claim 2 wherein the scoop member has a link member which is level with the top edges of the side walls, the link member having ends joined to the side walls at the exit to provide a hanging loop.

4. A scoop apparatus as claimed in claim 3 further comprising a. a lid adapted to cover an opening formed between the top edges of the side walls along the length of the handle portion;
    b. said lid having a side edge joined to one of the top edges of the side walls forming a living hinge; and,
    c. said living hinge adapted to allow the movement of the lid between a closed position wherein the opening is covered by the lid and an open position wherein the opening is not covered by the lid.

5. A scoop apparatus as claimed in claim 1 further comprising a removable lid adapted to cover an opening formed between the top edges of the side walls along the length of the handle portion.

6. A scoop apparatus as claimed in claim 1 further comprising:

a. a lid adapted to cover an opening formed between the top edges of the sides wall along the length of the handle portion; and
    b. a hinge having a first hinge portion joined to the lid and a second hinge portion joined to one of the side walls, said hinge adapted to allow the movement of the lid between a closed position wherein the opening is covered by the lid and an open position wherein the opening is not covered by the lid.

* * * * *